United States Patent [19]

Roche et al.

[11] 4,015,476
[45] Apr. 5, 1977

[54] SCANNING PYROMETER SYSTEM

[75] Inventors: John J. Roche; Glenn L. Hunsicker, both of Allentown, Pa.

[73] Assignee: Bethlehem Steel Corporation, Bethlehem, Pa.

[22] Filed: Nov. 8, 1974

[21] Appl. No.: 522,363

[52] U.S. Cl. .................................... 73/355 R
[51] Int. Cl.² ................................ G01J 5/52
[58] Field of Search ............... 73/346, 351, 355 R, 73/355 EM; 235/151.3; 307/235 A; 250/347

[56] References Cited

UNITED STATES PATENTS

| | | | |
|---|---|---|---|
| 2,008,793 | 7/1935 | Nichols | 73/355 R X |
| 2,422,971 | 6/1947 | Kell et al. | 250/347 |
| 3,164,724 | 1/1965 | Aiken | 250/347 X |
| 3,370,151 | 2/1968 | Normando | 73/355 R X |
| 3,482,448 | 12/1969 | Gaffard | 73/355 R |
| 3,510,057 | 5/1970 | Werme | 73/355 R X |
| 3,593,580 | 7/1971 | Ludwig | 73/351 X |
| 3,596,519 | 8/1971 | Blonder et al. | 73/355 R |
| 3,696,678 | 10/1972 | Mossey | 73/355 R X |
| 3,719,071 | 3/1973 | Hohenberg | 73/346 X |
| 3,777,568 | 12/1973 | Risgin et al. | 73/355 EM |
| 3,855,864 | 12/1974 | Douglas | 73/355 R |

Primary Examiner—Jerry W. Myracle
Attorney, Agent, or Firm—Joseph J. O'Keefe; John I. Iverson; George G. Dower

[57] ABSTRACT

Optical field scanning pyrometer system having oscillating scan mirror in stationary detector head scans field to measure temperature of moving hot bar or sheet which vibrates in field. Pyrometer scans through the permissible range of product movement to detect the hot product and measures and stores its temperature. The stored temperature signal is continuously fed to an external analytical computer and is updated at the end of each scan. The stored temperature signal is also displayed and recorded, but up-dating is less frequent. Scanning time and width can be varied to suit various process requirements.

12 Claims, 14 Drawing Figures

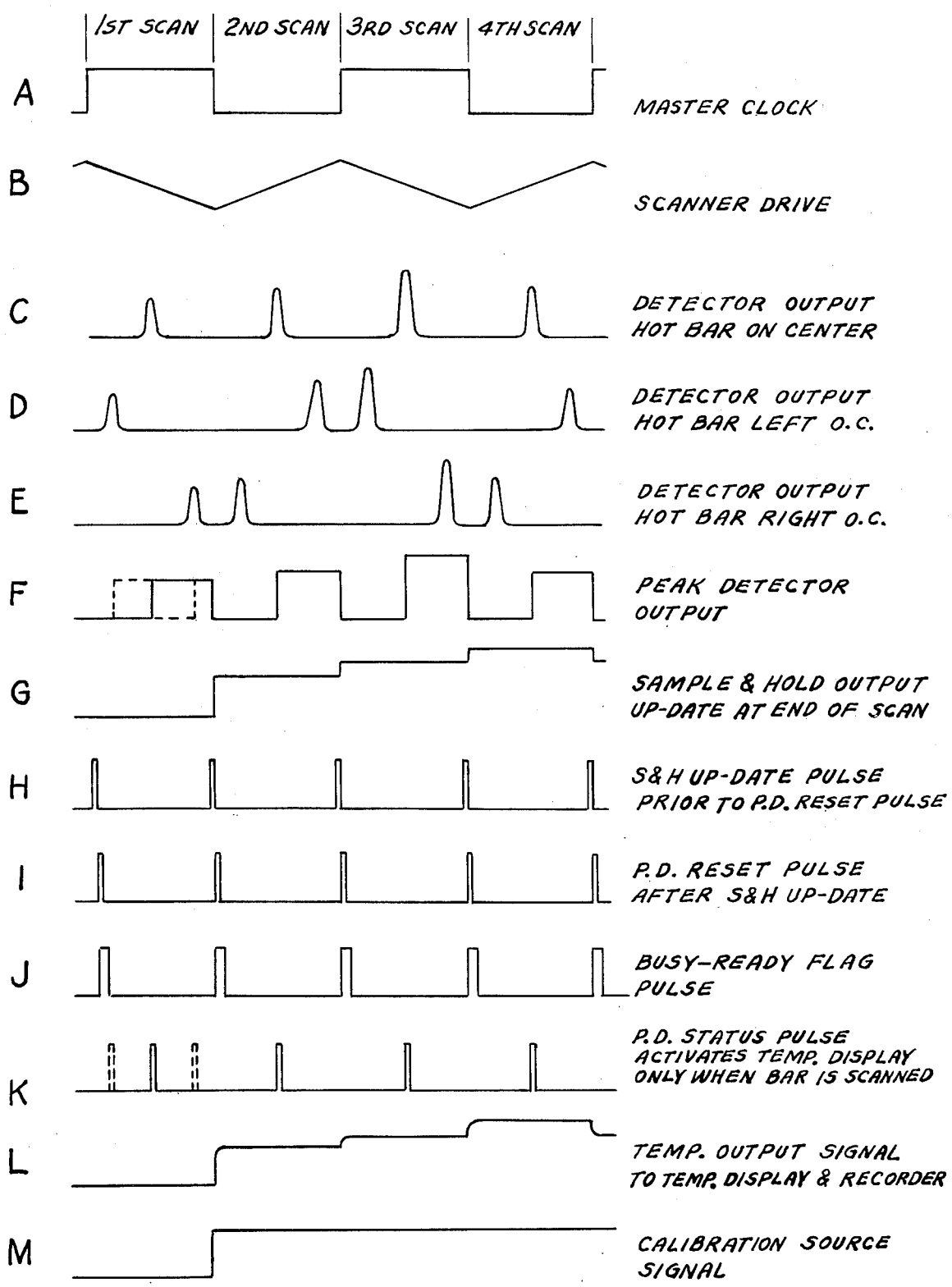

SCANNING PYROMETER SYSTEM

BACKGROUND OF THE INVENTION

1. Field of the Invention

This invention relates broadly to temperature measuring apparatus and more particularly to optical field scanning pyrometer systems.

2. Description of the Prior Art

There has been a long standing need to better control the finishing temperature of hot steel products rolled in many bar and sheet mills. Without accurate temperature control problems frequently arise with duplex grain and secondary scale growth which in themselves lead to subsequent problems connected with forming and pickling. Sometimes solutions to these and other problems require computer analysis involving temperature data to effect real-time process control.

Conventional pyrometers require continuous sighting on a hot target, and the target image fill the entire field, in order to provide a reasonably accurate temperature measurement of the target. Ordinarily the target must be stationary, but if movable must have sufficient area and uniformity of radiation characteristics to effictively fill the entire field at all times. In addition, convention pyrometer response is rather slow to rapid changes in temperature.

Thus, it will be appreciated that conventional pyrometers impose severe limitations on accurately and rapidly measuring the temperature, for example, of a small diameter hot bar (the target) moving longitudinally very rapidly through a bar mill while constantly vibrating in a lateral orbit defining a large image field, and in addition, experiencing rapid increases and/or decreases in bar temperature. Even modified pyrometers incorporating a peak-picker circuit with adjustable decay rates are not very satisfactory for such installations. Disadvantages with this approach is that the modified pyrometer is inherently slow and cannot be used, for example, in computer analysis. In addition, it can only follow temperature changes in one preset direction, either up or down, but not in both directions. Furthermore, it lacks scanning features to locate hot objects in an adjustable width field.

SUMMARY OF THE INVENTION

One of the objects of this invention is to provide improved temperature measuring apparatus.

Another object of this invention is to provide improved pyrometric apparatus for measuring the temperature of a longitudinally moving hot workpiece which may be displaced laterally in an image field larger than the longitudinal dimension of the workpiece.

A further object of this invention is to provide pyrometric apparatus with improved accuracy and speed of response to steady, as well as rapidly increasing or decreasing, temperatures of a workpiece.

The foregoing objects are attainable by an optical field scanning pyrometer system having an oscillating mirror and infrared detector with an image slit in a stationary scanning detector head adapted to rapidly scan through a permissible range of workpiece movement to detect the hot workpiece. The infrared detector feeds a peak detector and sample-and-hold circuits to measure and store the workpiece temperature signal. The stored temperature signal may be fed to an external analytical computer with up-dating occurring every scan, and in addition is displayed and recorded with less frequent up-dating to accommodate human observation. Provisions are made for varying field scanning time and width to suit various process requirements.

BRIEF DESCRIPTION OF THE DRAWINGS

FIGS. 2A – 2M show graphically various input, timing, output and other signals occurring throughout the scanning pyrometer system of the present invention. These figures are used throughout FIG. 1 to identify appropriate operating signals.

DESCRIPTION OF THE PREFERRED EMBODIMENT

Figure 1:
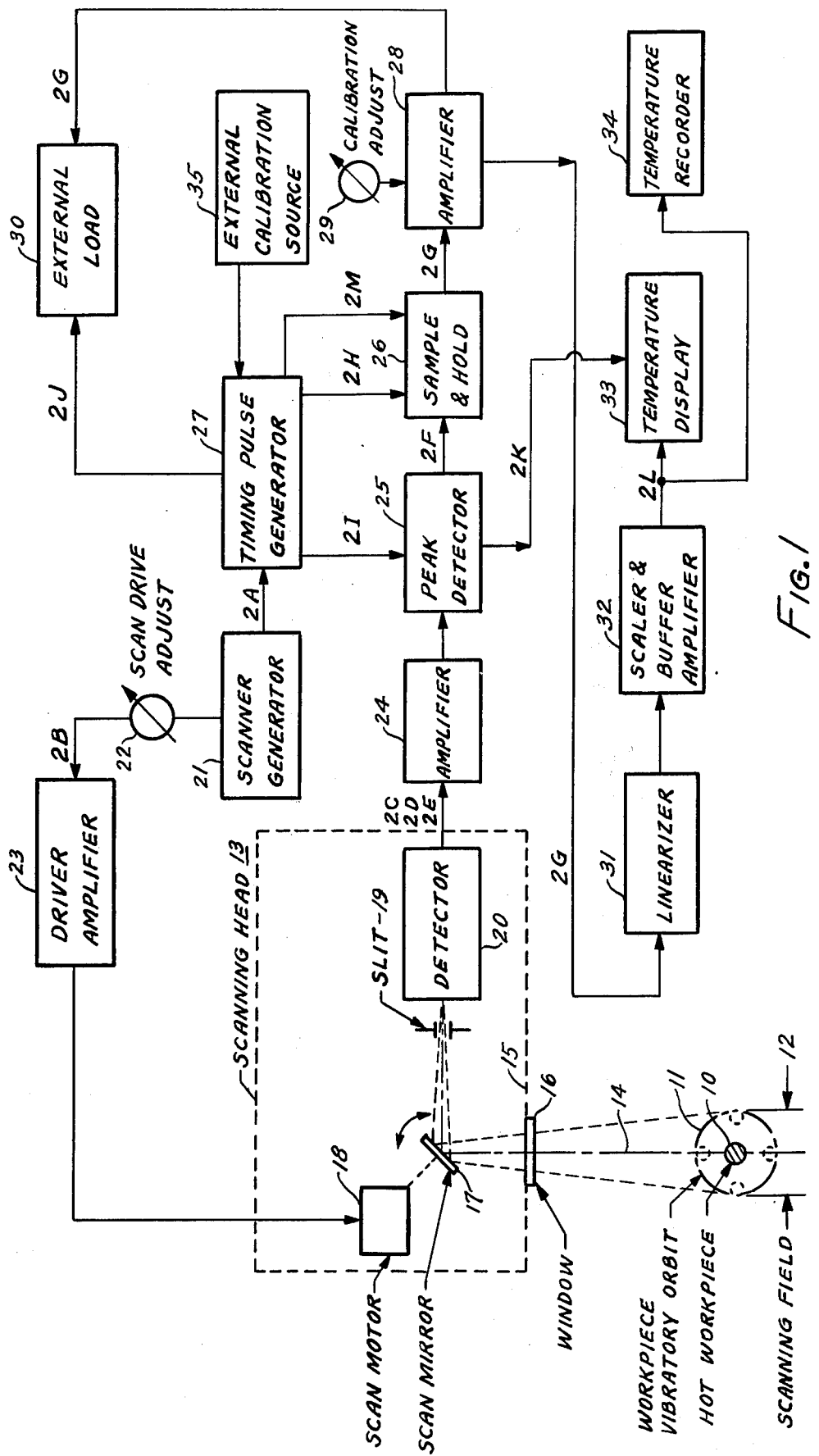
FIG. 1 is a block diagram of a scanning pyrometer system embodiment of the present invention.

Referring to FIGS. 1 and 2, the hot workpiece or target will be referred to hereinafter as hot bar 10 moving longitudinally toward the viewer. When exiting from a high-speed bar mill (not shown), hot bar 10 may vibrate and be obscured in a hot background of other materials. When vibrating it may be located at one position in vibratory orbit 11 and an instant later located at another position therein. This vibratory or lateral movement of hot bar 10 requires an image field substantially larger than hot bar 10 diameter, about 10 times the bar diameter, wherein the actual temperature of hot bar 10 must be detected accurately and rapidly. The image field hereinafter will be referred to as the scanning field 12. Another characteristic of hot bar 10 moving at a high speed is that its temperature may suddenly increase or decrease for various well known reasons, yet must also be detected accurately and rapidly.

Hot bar 10 temperature is detected by scanning head 13 which, for example, in a bar mill is mounted stationary between the last finishing stand and a divider shear (neither shown) with its optical axis 14 aligned with the central axis of hot bar vibratory orbit 11. Scanning head 13 includes a cobble-resistant, radiation-tight, housing 15 which is provided with radiation transmissive window 16 in the optical axis 14 and preferably is air purged (not shown) to keep window 16 clean of foreign matter.

Mounted in housing 15 in optical axis 14 is scan mirror 17 driven by scan motor 18 having oscillatory motion rather than rotary motion as will be explained below. Generally, scan mirror 17 and scan motor 18 are one assembly and may be of the oscillographic type, preferably General Scanning Corp., Series G-306.

Scanning head 13 also includes slit window 19 and detector 20. Slit 19 has a 0.1 × 0.7 inch window which, for ease of illustration, is shown separated from detector 20 but actually is incorporated in the face thereof. Detector 20 senses the temperature of hot objects in scanning field 12. Preferably, detector 20 is a Land Co. pyrometer No. NQO18 × 6/50 × 500/36K having an infrared-sensitive silicon cell with a pre-amplifier and optics (none shown) to focus the moving hot bar 10 on the silicon cell by way of slit window 19. The silicon cell in detector 20 produces a nonlinear output signal which follows a high power law, that is, the output signal varies according to approximately the tenth power. As scan motor 18 causes scan mirror 17 to move in either direction, slit window 19 image crosses hot bar 10 wherever located in orbit 11 and causes detector 20 output signal to peak sharply above background signal as will be explained below.

A scanning function is provided by scanner generator 21 which preferably consists of National Semiconductor Co. Model No. LM566 function generator. This device has two synchronized voltage controlled oscillators which produce amplitude-and frequency-variable step and ramp function output signals identified respectively in FIG. 2 as master clock 2A output and scanner drive 2B output. The scanner drive 2B output signal is attenuated by scan drive adjuster 22 and then fed to driver amplifier 23 such as an RCA power operational amplifier RCA-HC2000. The output of driver amplifier 23 is fed to scan motor 18 which causes scan mirror 17 to follow a ramp-type oscillatory scan according to scanner drive signal 2B pattern.

Scan drive adjuster 22 is adjusted so that the amplitude of the 2B signal causes scan motor 18 and scan mirror 17 to cover the entire scanning field 12 in 20 ms. Thus, the oscillatory movement of scan motor 18 permits scan mirror 17 to scan almost any width field which could not be done with a rotary scan mirror because of its fixed angular field coverage. In addition, the frequency at which a uniform scan may be made by scan motor 18 is established simply by adjusting the output frequency of scanner generator 21.

Regardless of the width of scanning field 12, slit window 19 will therefore cross the image of hot bar 10 when located anywhere in scanning field 12 and cause detector 20 output signal to peak when passing hot bar 10. The actual amplitude of the peak signal will vary precisely with the temperature of hot bar 10 regardless of its location in scanning field 12. Several of these situations are illustrated as follows. Detector 20 output signal 2C will occur when hot bar 10 is centrally located in scanning field 12 and hot bar 10 temperature increases for the first three scans and decreases for the fourth scan and so on. When hot bar 10 is located either to the left or right of center of scanning field 12 and bar temperature varies as in signal pattern 2C, then detector 20 output signal 2D or 2E, respectively, will occur. Thus, it will be seen that the amplitude peaking of detector 20 output signals will be unaffected by the location of hot bar 10 in scanning field 12.

Detector 20 output signal is amplified in low drift amplifier 24, such as Burr-Brown Co. Cat. No. 3440L, and fed to peak detector 25, such as Burr-Brown Co. Cat. No. 4084, the latter being adjusted to select and hold the highest value of voltage representing the temperature of hot bar 10 during each 20 ms. scan of field 12. Peak detector 25 is reset at the end of each scan as described below, but until reset provides a variable uniform amplitude temperature signal 2F at its signal output the instant a hot bar 10 is detected in the scanning field. The solid line signal 2F corresponds to the timing of hot bar 10 detection under the bar location conditions of signal 2C, while the dotted line signals correspond to the timing of signals 2D and 2E. Peak detector 25 also provides a digital pulse 2K at a status output to denote presence or absence of hot bar 10 in scanning field 12 for use as described below.

Peak detector 25 output signal 2F is fed to a sample and hold device 26, such as Burr-Brown Co. Cat. No. 4035, which holds the peak temperature signal from the previous scan. At the end of each scan, but before peak detector 25 is reset, sample and hold device 26 receives a sample command as described below to read and hold the present-value peak detector 25 output signal 2F and provide a steady D.C temperature signal 2G at its signal output for the duration of the next scan.

If there is no hot bar 10 in scanning field 12, then there will be no signal at the outputs of either peak detector 25 or sample and hold device 26.

Timing pulse generator 27 receives the master clock pulse signal 2A from scanner generator 21 and continuously generates the following signals at 20 ms. intervals: (a) the sampling command signal 2H, occurring 30 microseconds after the end of a scan for a duration of about 160 microseconds, which is fed to a sample command input of sample and hold device 26, (b) the reset signal 2I, occurring at the end of signal 2H for a duration of about 100 microseconds, which is fed to the reset input of peak detector 25, and (c) a busy-ready flag pulse 2J, occurring at the end of scan signal 2B for a duration of about 290 microseconds, which is fed to an external source. When high, signal 2J indicates pyrometer busy condition during updating of the sample and hold device 26, and when low signifies ready or valid conditions for using the stored temperature output signal 2G. Timing pulse generator 27 also receives a control signal from an external calibration source which inhibits command signal 2H to sample and hold device 26 for a predetermined duration of said external calibration source. Timing pulse generator 27 is custom made from conventional flip-flop and logic integrated circuits and may be wired by any one having ordinary skill in the art when given the functions stated above and pulse forms shown in FIG. 2.

The output signal 2G from sample and hold device 26 is a nonlinear analog temperature signal which is updated ever 20 ms. scan and is amplified in amplifier 28 and calibrated for hot bar 10 emissivity by calibration adjuster 29. Amplified nonlinear temperature signal 2G is fed together with busy-ready flag pulse 2J to external load 30. External load 30 may be a general purpose digital computer programmed to linearize and analyze, or otherwise use, the nonlinear temperature signal 2G at 20 ms. scan intervals under control of the busy-ready flag pulse 2J.

The amplified nonlinear analog temperature signal 2G is also fed to linearizer 31 which is a 10-stage diode break-point linearizer such as is shown on Land Co. Dwg. No. L-928. The linearized analog temperature signal is processed in scaler and buffer amplifier device 32 where it is zero suppressed, if necessary, and amplified with a suitable gain to provide a temperature output signal 2L. Device 32 also includes smoothing circuitry having a long time constant of about 700 ms., which is not shown in FIG. 2L on same time base as the preceding signals.

The smoothed and linearized temperature signal 2L is fed to temperature display device 33, and temperature recorder 34, where it is displayed free of flicker. Temperature display device 33 may be a commercial digital voltmeter calibrated to read directly in temperature digits over a predetermined range of say about 1500° to 2300° by scaler and buffer amplifier device 32. Temperature display device 33 is enabled to read only when a hot bar 10 is in scanning field 11 as determined by the peak detector 25 status pulse 2K described above. Temperature recorder 34 may be any one of a variety of commercially available strip chart recorders.

Provisions are made in the present scanning pyrometer system for calibrating the system in the hot rolling mill environment by using external calibration source 35. Source 35 is a well known disappearing filament pyrometer which is aimed at hot bar 10 when not moving, or to a calibrating hot box to which scanning head 13 is also aimed. When a comparison reading of hot bar 10, or the calibrating hot box, is obtained by the disappearing filament pyrometer, a switch is activated on the latter device to cause timing pulse generator 27 to inhibit the sampling command pulse 2H for a predetermined holding period and to hold the temperature signal detected by scanning head 13 in sample and hold device 26. During the holding period, calibration adjuster 29 is adjusted so that the temperature reading on display device 33 agrees with that obtained on the disappearing filament pyrometer. After the holding period expires, timing pulse generator disconnects external calibration source 35 signal and the sample command pulse 2H is restored for use as described above.

We claim:

1. A scanning pyrometer system for determining a variable temperature of a movable hot workpiece which may experience increases or decreases in temperature at various locations in a scanning field, said system comprising:
 a. means including an oscillating mirror for continuously scanning said field, and further including a detector aligned with said mirror for producing a detector output signal which varies with the temperature of said hot workpiece,
 b. means for detecting and storing a new peak in the variable temperature detector output signal each scan, said means adapted to be updated each scan,
 c. means synchronized only with the mirror movement in scanning means (a) for controlling the updating of means (b), and
 d. means for utilizing the stored peak temperature signal to determine the temperature of said hot workpiece.

2. The apparatus of claim 1 wherein means (d) includes means for providing the stored peak temperature signal to an external load.

3. The apparatus of claim 1 wherein means (c) is adapted to generate a busy-ready flag pulse during the updating-storing of said peak detected temperature signal and means (d) includes means for providing the stored peak temperature signal and the busy-ready flag pulse to an external load, whereby the flag pulse presence is indicative to the external load that the peak detected temperature signal is being updated.

4. The apparatus of claim 1 wherein means (d) includes means operative according to a high power law for linearizing substantially all nonlinearities in variations of said stored peak temperature signal with respect to actual temperature of said hot workpiece.

5. The apparatus of claim 1 wherein means (d) includes means for digitally displaying the stored peak temperature signal.

6. A scanning pyrometer system for determining a variable temperature of a movable hot workpiece which may experience increases or decreases in temperature at various locations in a scanning field, said system comprising:
 a. means including an oscillating mirror for continuously scanning said field, and further including a detector aligned with said mirror for producing a detector output signal which varies with the temperature of said hot workpiece,
 b. means for detecting and storing a new peak in the variable temperature detector output signal each scan, said means adapted to provide a status pulse only when the hot workpiece is in the scanning field and further adapted to be updated each scan,
 c. means synchronized only with the oscillating mirror in scanning means (a) for controlling the updating of means (b), and
 d. means for utilizing the stored peak temperature signal to determine the temperature of said hot workpiece, said means including digital display means adapted to display said stored peak temperature signal only in response to said status pulse.

7. In a scanning pyrometer system where scanning means including a scanning head continuously scans a field to cause measurement and display of the temperature of a hot workpiece at various possible locations in the scanning field, said scanning head comprising:
 a. a stationary opaque housing having a radiation transmissive window aligned along the axis of the scanning field,
 b. a scanning mirror located in said housing behind said window in alignment with said scanning field, said scanning mirror adapted to be oscillated pivotally by an external electrical source to cover an adjustable width scanning field during an adjustable time period, and
 c. radiation responsive means located in said housing and aligned with said scanning mirror and a fixed slit for producing a detector output signal during each scan which represents the temperature of said hot workpiece when located anywhere in said scanning field.

8. The system of claim 7 wherein said scanning means further includes electronic means for controlling said scanning mirror pivotal oscillations including means for adjusting the angular width of said scanning field, the scanning time period, or both.

9. In a scanning pyrometer system for determining a variable temperature of a movable hot workpiece which may experience increases or decreases in temperature at various locations in a scanning field, said system comprising means including an oscillating mirror for continuously scanning said field, and further including a detector aligned with said mirror for producing a detector output signal which varies with the temperature of said hot workpiece, circuit means comprising:
 a. means for detecting and storing a new peak in the variable temperature detector output signal each scan, said means (a) adapted to be updated each scan and provide drive means for utilizing the stored temperature signal, and
 b. means synchronized only with the mirror movement in said scanning means for controlling the updating of means (a).

10. The system of claim 9 wherein said circuit means further includes:
 c. means enabling the stored peak temperature signal to be utilized to determine the temperature of said hot workpiece.

11. The system of claim 9 wherein said circuit means further includes:
 c. means for utilizing the stored peak temperature signal to determine the temperature of said hot workpiece.

12. A scanning pyrometer system for determining a variable temperature of a movable hot workpiece which may experience increases or decreases in temperature at various locations in a scanning field, said system comprising:

a. means for continuously scanning said field and producing a variable temperature detector output signal which varies with the temperature of said hot workpiece,
b. means for detecting a new peak in the variable temperature detector output signal during the present scan, said means adapted to be reset each scan by a momentary reset pulse,
c. means for storing the new peak temperature signal detected during the previous scan, said means adapted to be updated each scan by a momentary sampling command signal,
d. timing generator means synchronized with scanning means (a) for continuously producing said momentary sampling command pulse at the end of the present cycle and said momentary reset pulse immediately thereafter, and
e. means for utilizing the stored temperature signal to determine the temperature of said hot workpiece.

* * * * *